United States Patent
Bajt et al.

(10) Patent No.: US 10,867,717 B2
(45) Date of Patent: Dec. 15, 2020

(54) OPTICAL ELEMENT FOR DEFLECTING X-RAYS

(71) Applicant: Deutsches Elektronen-Synchrotron DESY, Hamburg (DE)

(72) Inventors: Sasa Bajt, Hamburg (DE); Mauro Prasciolu, Hamburg (DE)

(73) Assignee: Deutsches Eiektronen-Synchrotron DESY, Hamburg (DE)

( * ) Notice: Subject to any disclaimer, the term of this patent is extended or adjusted under 35 U.S.C. 154(b) by 32 days.

(21) Appl. No.: 15/975,335

(22) Filed: May 9, 2018

(65) Prior Publication Data

US 2018/0330840 A1    Nov. 15, 2018

(30) Foreign Application Priority Data

May 9, 2017    (EP) ..................... 17170299

(51) Int. Cl.
  *G02B 5/124*    (2006.01)
  *G21K 1/06*     (2006.01)
  *G01N 23/20008* (2018.01)
  *B82Y 10/00*    (2011.01)

(52) U.S. Cl.
  CPC ....... *G21K 1/062* (2013.01); *G01N 23/20008* (2013.01); *G21K 1/067* (2013.01); *B82Y 10/00* (2013.01); *G21K 2201/067* (2013.01)

(58) Field of Classification Search
  CPC . G02B 27/09; G21K 1/00; G21K 1/02; G21K 1/025
  See application file for complete search history.

(56) References Cited

U.S. PATENT DOCUMENTS

| | | | | |
|---|---|---|---|---|
| 4,992,082 A | * | 2/1991 | Drawl | C23C 14/06 51/295 |
| 5,433,988 A | * | 7/1995 | Fukuda | B32B 15/08 359/359 |
| 6,226,349 B1 | | 5/2001 | Schuster et al. | |
| 2008/0043221 A1 | * | 2/2008 | Natura | G01N 21/6402 356/36 |

FOREIGN PATENT DOCUMENTS

DE    10 2013 005845 B3    4/2014

OTHER PUBLICATIONS

Brejnolht et al. "Reflective multilayer optics as hard X-ray diagnostic on laser-plasma experiment", Lawrence Livermore National Laboratory, Jan. 12, 2015, pp. 1-13 (Year: 2015).*

(Continued)

*Primary Examiner* — David P Porta
*Assistant Examiner* — Mamadou Faye
(74) *Attorney, Agent, or Firm* — Jenkins, Wilson, Taylor & Hunt P.A.

(57) ABSTRACT

An optical element for deflecting X-rays comprising a multilayer structure including amorphous first WC layers and amorphous second SiC layers, wherein each two adjacent ones of the first layers are separated by a respective one of the second layers such that the first and second layers are arranged alternatingly, wherein at least some of the first layers and at least some of the second layers have a thickness of at least 3 nm. A method of producing such an optical element and to use of such an optical element is also disclosed.

15 Claims, 3 Drawing Sheets

(56) References Cited

OTHER PUBLICATIONS

Stark "New energy record set for multilayer-coated mirrors", Phys. org, Sep. 12, 2014, pp. 1-2. (Year: 2014).*
Anderson "S-ray Multilayer Lens Delivers Shaper Images of Nanotech World", TechFragments, Jun. 2, 2015, pp. 1-5. (Year: 2015).*
European Search Report for European Application No. 17170299.6 dated Nov. 8, 2017.
Jensen et al., "Investigation of new material combinations of hard x-ray telescope designs", Proceedings Optical Diagnostics of Living Cells II, vol. 6266, p. 626612, Jun. 14, 2006.
Jensen et al., "Small D-Spacing WC/SiC Multilayers for Future Hard X-Ray Telescope Design", Experimental Astronomy; An International Journal of Astrological Instrumentation and Data Analysis, Kluwer Academic Publishers, DO, vol. 20, No. 1-3, p. 93-103, Jun. 16, 2006.
Fernandez-Perea et al., "Ultra-short-period WC/SiC multilayer coatings for x-ray appiications", NIM A 710, 114-119 (2013).
Kim et al., "Damage threshold of platinum/carbon multilayers", Optic Express 29034, vol. 23, No. 22, Nov. 2, 2015.
Morgan et al., "High Numerical Aperture Multilayer Laue Lenses", Scientific Reports (Nature) 5:09892, DOI:10.1038/srep09892, Jun. 1, 2015.
Jensen et al., "Investigation of new material combinations of hard x-ray telescope designs", Proceedings Optical Diagnostics of Living Cells II, vol. 6266, p. 626612-1—12-8, Jun. 14, 2006.

\* cited by examiner

OPTICAL ELEMENT FOR DEFLECTING X-RAYS

CROSS-REFERENCE TO RELATED APPLICATION

This application claims priority to European Patent Application No. 17170299.6 filed May 9, 2017, the entire disclosure of which is incorporated by reference herein.

TECHNICAL FIELD

The disclosure herein relates to an optical element for deflecting X-rays comprising a multilayer structure including a plurality of first layers comprising a first material and a plurality of second layers comprising a second material, wherein each two adjacent ones of the first layers are separated by a respective one of the second layers such that the first and second layers are arranged alternatingly.

BACKGROUND

X-rays are utilized in many fields of technology, and in many of these applications it is required to be able to reliably deflect X-rays for guiding, dispersing or focusing purposes. For example, hard X-rays may be advantageously utilized for high-resolution imaging and micro-spectroscopy applications, and it is then generally necessary to provide for one or more optical elements adapted to focus the X-rays onto a relatively small beam spot. Known optical elements or X-ray optics suitable for deflecting X-rays include mirrors, gratings and volume zone plates or multilayer Laue lenses. In the prior art various different material structures are utilized for X-ray optics.

For example, mirrors having a single layer coating are used which comprise a reflecting material on a substrate. These mirrors are used under grazing incidence, i.e. the angle of incidence relative to the mirror surface is sufficiently small for total reflection of the impinging X-rays occurs, thereby deflecting the X-rays into the desired direction. Another type of X-ray mirrors comprises a multilayer structure as a coating on a substrate. In case of a periodic arrangement of the multiple layers of the multilayer structure, the incident X-rays are diffracted by the structure and appear to be deflected at an angle at which the Bragg condition is met. As compared to optical elements comprising a single layer coating and relying on total reflection, such multilayer structures have the advantage that the deflection angles are generally much larger, so that the mirror can have smaller dimensions.

Multilayer Laue lenses likewise comprise a multilayer structure on a substrate. However, different from the case of an X-ray mirror, the incoming X-rays are incident on the multilayer structure essentially in a direction transverse to the stacking direction of the layers arranged one on top of the other. Multilayer Laue lenses are diffractive optical elements which are similar to standard x-ray zone plates and consist of a depth graded multilayer that follows the Fresnel zone-plate formula. They are deposited on a flat substrate, which itself is sliced to the desired optical depth, and comprise within a single multilayer structure layers of varying thicknesses ranging from, e.g., smaller than 1 nm to 30 nm or above. The resolution of a multilayer Laue lens is determined by the smallest zone height. Multilayer Laue lenses are described in, e.g., Morgan et al., "High numerical aperture multilayer Laue lenses", Scientific Reports (Nature) 5:09892, DOI: 10.1038/srep09892, Jun. 1, 2015.

For X-ray optical elements relying on and comprising multilayer structures it is important that there is a very sharp interface between adjacent layers and that the individual layers have well defined thicknesses and distances to other layers. Moreover, it is also important that the configuration of the multilayer structure and, in particular, the interface sharpness and the layer thicknesses and distances do not change over time and during use, because this degrades the quality of the optical element and eventually renders it unusable. However, such changes have been observed at high temperatures or upon high local deposition of energy by the incident X-rays, as described in, e.g., Kim et al., OPTIC EXPRESS 29034, "Damage threshold of platinum/carbon multilayers", 2015, Vol. 23, No. 22. One of the processes responsible for the undesirable changes is, e.g., diffusion between adjacent layers. In order to prevent such changes, the multilayer structures need to have a high thermal stability.

This is all the more the case for hard X-rays having very short pulse durations and high intensities, such as X-rays generated by modern free electron X-ray lasers (XFEL) or synchrotrons. Such high-intensity hard X-rays provided by high-brightness radiation sources are of great interest for many applications. With increasing brightness radiation damage, such as radiation induced diffusion between adjacent layers, likewise increases, in particular due to the high local deposition of energy.

Typically, a high resistance to radiation is achieved by materials having a small atomic number $Z$, a low density as well as a high melting point. In this regard, it has been observed that there is a relationship between a high melting temperature and a high resistance to radiation. All materials having a high resistance to radiation also have a high thermal stability, so that from a high thermal stability it can be concluded that the material also has a high resistance to radiation.

For X-ray optical elements it is also generally desirable for them to have a high reflectivity for hard X-rays. From Fernandez-Perea et al., "Ultra-short-period WC/SiC multilayer coatings for x-ray applications", NIM A 710, 114-119 (2013) a WC/SiC multilayer structure having a high reflectivity for high energy X-rays is known. The multilayer structure is described for use with low intensity X-rays, and in accordance with the use of tungsten, i.e. a material having a high atomic number $Z$, neither thermal stability nor a suitability for use with high-intensity or high-brightness X-rays is mentioned.

SUMMARY

It is an object of the disclosure herein to provide an optical element for deflecting X-rays comprising a multilayer structure of the above type, having sharp interfaces between adjacent layers, wherein the sharpness of the interfaces and the layer thicknesses and distances are maintained or essentially maintained upon irradiation with high intensity X-rays and upon occurrence of high temperatures.

This object is achieved by an optical element, a method and by a use as disclosed herein. Advantageous embodiments of the optical element, of the method and of the use are disclosed herein.

BRIEF DESCRIPTION OF THE DRAWINGS

In the following, exemplary embodiments of the disclosure herein will be explained in detail with reference to the example drawings.

DETAILED DESCRIPTION

Figure 1:
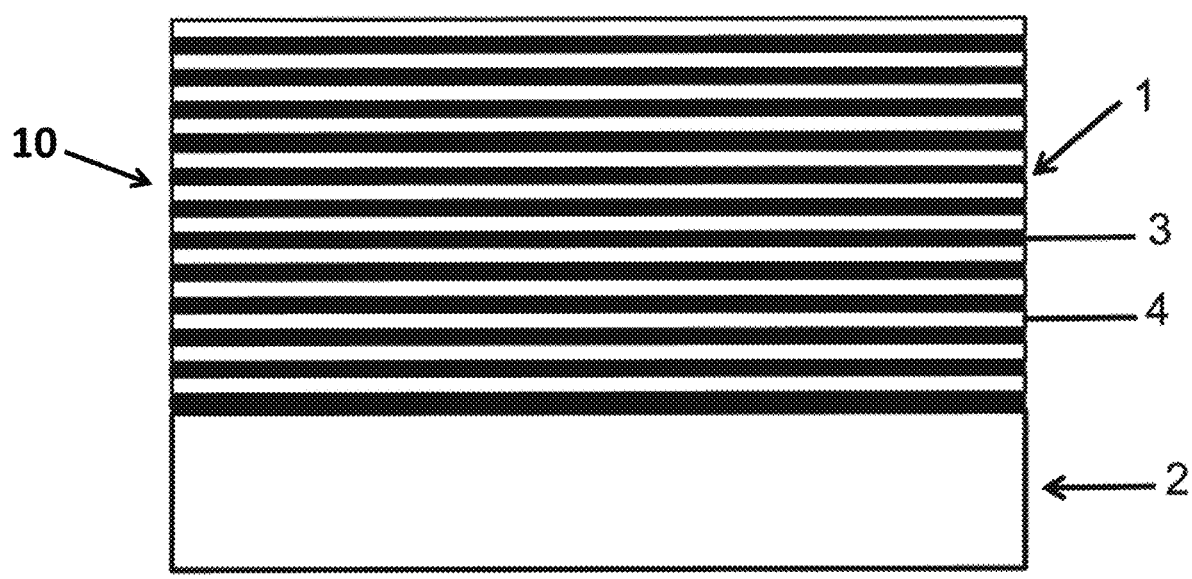
FIG. 1 shows a schematic cross-sectional view of an embodiment of an optical element according to the disclosure herein.

According to the disclosure herein an optical element for deflecting X-rays is provided. The optical element comprises a multilayer structure, i.e. an arrangement including a plurality or sequence of layers disposed one on top of the other. The multilayer structure, which is preferably provided on a substrate, which is likewise part of the optical element, includes a plurality of amorphous first tungsten carbide (WC) layers and a plurality of amorphous second silicon carbide (SiC) layers. Thus, each of the first layers comprises, consists or essentially consists of WC, and each of the second layers comprises, consists or essentially consists of SiC. Each two adjacent ones of the first layers are separated by a respective one of the second layers such that the first and second layers are arranged alternatingly along the direction perpendicular to the extension of the layers. In other words, a single one of the first layers is disposed between each two adjacent ones of the second layers, and a single one of the second layers is disposed between each two adjacent ones of the first layers. Preferably, each two adjacent ones of the first and second layers are in direct contact with each other. One or more of the first layers and one or more of the second layers have a thickness of at least 3 nm, preferably at least 4 nm, and more preferably at least 5 nm.

Due to the first and second layers being amorphous the interfaces between adjacent first and second layers are smooth and sharp. Generally, it is not possible or at least it is difficult to provide or maintain layers having a thickness exceeding 2 to 3 nm in an amorphous state. It has been found surprisingly that when choosing the material combination WC and SiC for the alternating layers of the multilayer structure, it is easily possible to provide the layers in an amorphous state and that this amorphous state is stable, also in particular for multilayer structures having a total thickness of 50 μm or more. Further, it has been found that the choice of this material combination provides for a high reflectivity and a high thermal stability with respect to the thicknesses and distances of the individual layers from each other. For these reasons, the optical element according to the disclosure herein have also a high resistance to radiation and are particularly suitable for deflecting hard X-rays having a high intensity, for example X-rays provided by modern high brightness sources, such as a free electron X-ray laser or a next generation synchrotron.

In a preferred embodiment the first layers and the second layers comprise thicknesses in a range of 0.6 nm to 30 nm and preferably different thicknesses from this range. Providing first and second layers having multiple different thicknesses from this range is necessary and particularly advantageous if the optical element is a multilayer Laue lens or a thick periodic multilayer that can be used as a grating in Laue geometry and has a thickness of, e.g., 50 μm or more. For example, in a preferred embodiment the first layers comprise a layer having a thickness of 0.6 to 2 nm and/or the second layers comprise a layer having a thickness of 0.6 to 2 nm. Alternatively or additionally the first layers comprise a layer having a thickness of 20 to 30 nm and/or the second layers comprise a layer having a thickness of 20 to 30 nm. In case of such non-periodic multilayer structures it is also conceivable that the thickness of the individual layers varies along the direction of extension of the respective layer, i.e. the thickness changes within the layer. For example, the multilayer structure can be configured as a laterally graded multilayer structure. Furthermore, it is also possible that the thicknesses and, thus, the distances between successive layers of the same type vary in a predefined manner. For example, a parabolic relationship according to $z(j)=a+b\,j+c\,j^2$, an exponential relationship according to $z(j)=a+b\,\exp(c\,j)$, a logarithmic relationship according to $z(j)=a+b\,\ln(c\,j)$ or a relationship according to a power law $z(j)=a/(b+j)^c$ are conceivable, wherein j is the number of the respective layer, $z(j)$ is the thickness of the layer j, and a, b and c are constants. Such a non-periodic configuration may also be of interest for mirrors to be employed in an energy interval, without predominantly reflecting radiation having a particular energy.

Alternatively, it is also possible that all first layers comprise the same thickness and/or all second layers comprise the same thickness. In particular, it is also possible that the distances between adjacent ones of the first layers is constant for all first layers and that the distances between adjacent ones of the second layers is constant for all second layers, so that, overall, a periodic structure results.

Furthermore, it is to be noted that the multilayer structure does not necessarily need to be planar, but may also have a curved configuration.

In a preferred embodiment for at least some of the first layers and/or for at least some of the second layers the layer thickness changes along the extension of the respective layers.

In a preferred embodiment the sum of the number of first layers and the number of second layers is at least 5000, and preferably at least 10000.

In a preferred embodiment the optical element is a multilayer Laue lens.

In a preferred embodiment the optical element is a grating in Laue geometry.

In an alternative preferred embodiment the optical element is an X-ray mirror for reflecting X-rays.

In a preferred embodiment the optical element further comprises a substrate (e.g. a Si substrate) and one or more third layers, wherein the multilayer structure is disposed between the substrate and the at least one third layer. In these cases, the multilayer structure forms a stable protective coating for the substrate.

Preferably, the overall thickness of the multilayer structure is at least 200 nm in the case of mirrors in order to achieve the desired reflectivity. For other optical elements, such as multilayer Laue lenses, the overall thickness may preferably be much greater, such as, e.g., 50 μm or higher.

The optical element having the above-described configuration may be advantageously produced by a method comprising a two stage magnetron sputtering process. First of all, one or more first sputtering targets made of WC and one or more second sputtering targets made of SiC are each produced by magnetron sputtering. Subsequently, these first and second sputtering targets are themselves utilized in a separate magnetron sputtering process in which the multilayer structure of the optical element is prepared by depositing each of the first layers by the separate magnetron sputtering process. It has been found that the use of sputtering targets, which are themselves produced by magnetron sputtering, makes it particularly simple to reliably produce amorphous layers having sharp interfaces. It has further surprisingly been found that the reliability can be further improved when using Kr gas as sputtering gas in the above magnetron sputtering processes.

The above-described optical element is particularly suitable and advantageous for use for deflecting X-rays, wherein the X-rays are high-intensity X-rays having a power per area of at least 500 W/m$^2$. In a preferred embodiment the high-intensity X-rays have an energy of at least 2 keV, preferably at least 8 keV. Alternatively or additionally, it is preferred if the high-intensity X-rays are pulsed high-intensity X-rays having a fluence of at least 50 mJ/cm$^2$ and preferably a maximum pulse duration of 100 ps, more preferably 100 fs.

It should be noted that this advantageous use also applies to multilayer structures in which some or all of the layers have thicknesses below 3 nm, such as, e.g., in the range of 1 nm, but which otherwise have the above-described configurations. For example, each of the layers could have a thickness in a range of 0.5 to 5 nm such as, e.g., 1 nm. Simulations for WC/SiC multilayer structures show that for a layer thickness of 1 nm and X-rays having an energy in the range of between 8 and 20 keV the angle with respect to the surface of the multilayer structure, under which angle the first Bragg peak occurs, is between 0.89° and 2.24°, wherein the reflectivity is between 59% and 67%. In comparison, the angle for total reflection for such X-rays on X-ray mirrors having a single layer coating of B$_4$C or SiC is only 0.1° to 0.27° with a reflectivity of 80%. Thus, for the multilayer structures the angle is about ten times the angle for the single layer mirrors at essentially the same reflectivity, so that the mirrors can have smaller dimensions. In addition, due to the particular choice of the material combination WC and SiC, the multilayer structures and the corresponding optical elements are sufficiently stable under high intensity X-ray irradiation.

FIG. 1 shows a schematic cross-sectional view through an optical element 10 which can be used, e.g., for reflecting high-intensity X-rays and which comprises a multilayer structure 1 and a substrate 2 on which the multilayer structure 1 is provided. The substrate 2 may be, e.g., monocrystalline Si. FIG. 1 shows a planar configuration, but it is also conceivable that the multilayer structure 1 and the entire optical element 10 is curved.

The multilayer structure 1 comprises multiple amorphous WC layers 3 and multiple amorphous SiC layers 4, which are alternatingly disposed one on top of the other. In the example shown, all layers 3, 4 have identical thicknesses, so that the overall configuration of the multilayer structure 1 is periodic. However, as explained in detail above, the thicknesses may also vary throughout the multilayer structure 1. In any case, at least one of the layers 3 and at least one of the layers 4 has a thickness of 3 nm or more.

Figure 2:
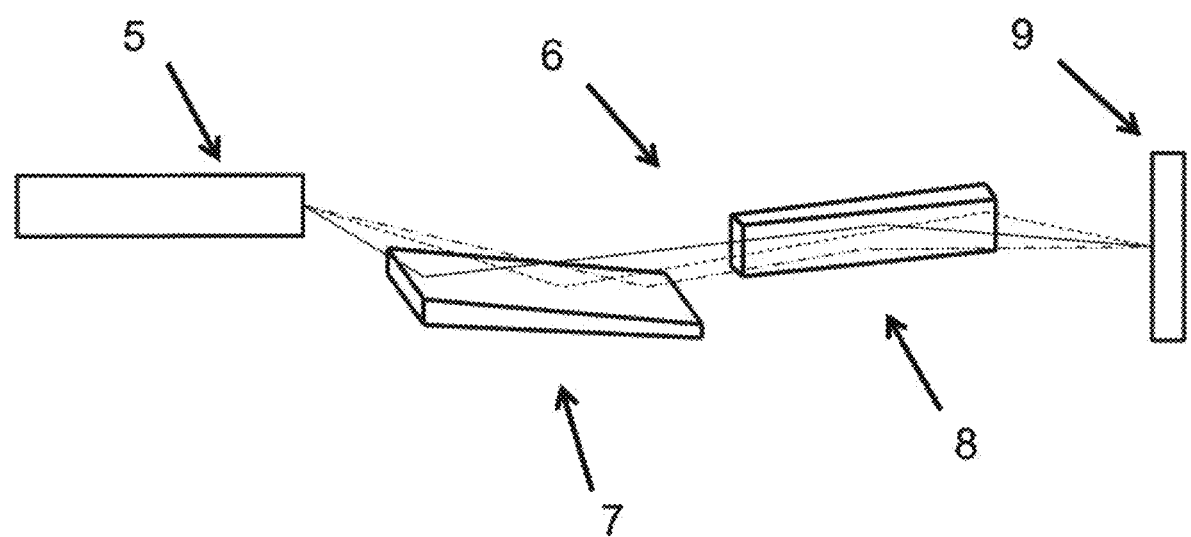
FIG. 2 schematically shows an embodiment in which two optical elements according to the disclosure herein are utilized as X-ray mirrors in a beam path from an X-ray source to a sample.

FIG. 2 schematically shows a beam path with an X-ray source 5 and an X-ray mirror arrangement 6, in which the above-described optical element 10 is utilized as two X-ray mirrors 7, 8 for reflecting high-intensity, preferably pulsed, X-rays.

Figure 3:
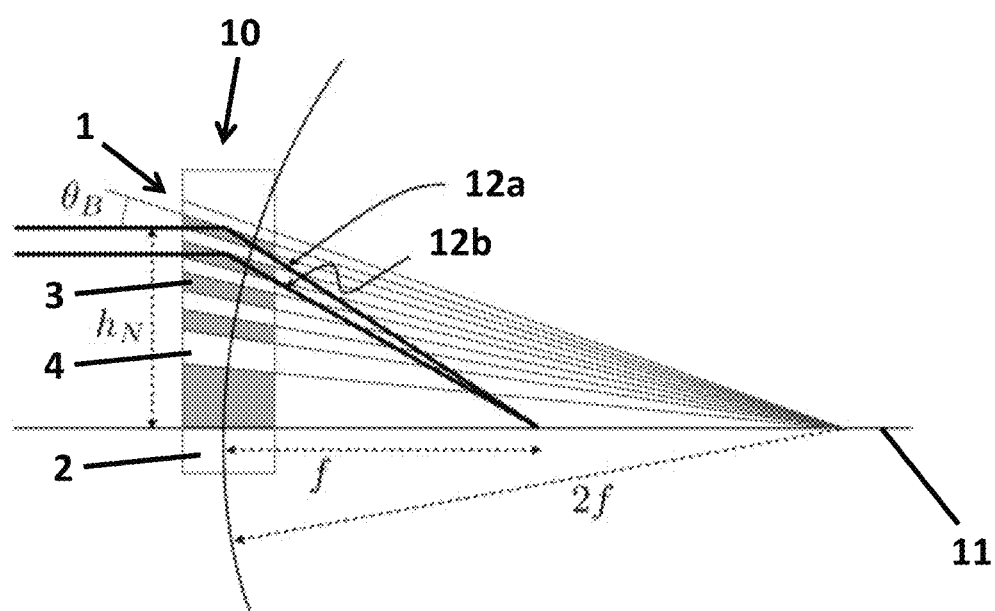
FIG. 3 is a schematic cross-sectional view of another embodiment of an optical element according to the disclosure herein, wherein the optical element is a multilayer Laue lens.

FIG. 3 shows a schematic cross-sectional view through another optical element 10 in the form of a multilayer Laue lens. Similar to the embodiment of FIG. 1, the multilayer Laue lens 10 comprises a multilayer structure 1 provided on a substrate 2, which may be, e.g., monocrystalline Si, and the multilayer structure 1 comprises multiple amorphous WC layers 3 and multiple amorphous SiC layers 4, which are alternatingly disposed one on top of the other. However, different from the embodiment of FIG. 1, individual layers 3, 4 of the multilayer structure 1 of the optical element 10 shown in FIG. 3 having varying thicknesses and are oriented at different tilt angles respect to an optical axis 11 and the horizontal direction of FIG. 3. For example, the layer thicknesses of the layers 3 and of the layers 4 vary between 0.6 nm and 30 nm. In any case, the layer thicknesses are chosen such that they follow the zone plate law, so that incident rays reflected at adjacent bilayers, i.e. adjacent separate pairs of layers 3, 4, have an optical path difference of one wavelength, A, at the focus caused by the difference in the thicknesses. The tilt angles are chosen such that their orientation corresponds to the Bragg angle $\theta_B$ for the respective layer spacing. Thus, Bragg's law and the zone plate law are fulfilled simultaneously for each of the layers 3, 4, thereby achieving large numerical apertures allowing to efficiently focus X-rays to nanometer spots. The multilayer Laue lens has a focal length f, and in FIG. 3 two exemplary rays 12a, 12b are shown being focused to a focal spot on the optical axis 11.

Another structure is a grating in Laue geometry. Similar to the multilayer Laue lens it is used in cross section, i.e. in use the X-rays are incident on a surface of the multilayer structure extending transversely or perpendicularly with respect to the direction of extension of the layers. However, different from the case of a multilayer Laue lens, in the grating in Laue geometry the multilayer structure comprises the WC and SiC layers in a flat and periodic arrangement, and all layers have the same orientation. This structure disperses hard x-rays with very high efficiency and can also be used with hard XFEL or synchrotron sources.

Because WC and SiC remain amorphous it is possible for all of the above-mentioned optical elements to include multilayer structures that have a total thickness of 50 μm or more and still preserve smooth and sharp interfaces between adjacent ones of the layers.

The invention claimed is:

1. An optical element for deflecting X-rays comprising:
   a multilayer structure including a plurality of amorphous first layers of tungsten carbide (WC) and a plurality of amorphous second layers of silicon carbide (SiC);
   wherein each two adjacent ones of the first layers are separated by a respective one of the second layers such that the first and second layers are arranged alternatingly; and
   wherein at least some of the first layers and at least some of the second layers have a thickness of at least 3 nm.

2. The optical element according to claim 1, wherein the first layers and the second layers comprise thicknesses in a range of 0.6 nm to 30 nm.

3. The optical element according to claim 1, wherein the first layers comprise a layer having a thickness of 0.6 to 2 nm and/or the second layers comprise a layer having a thickness of 0.6 to 2 nm, and/or wherein the first layers comprise a layer having a thickness of 20 to 30 nm and/or the second layers comprise a layer having a thickness of 20 to 30 nm.

4. The optical element according to claim 1, wherein for at least some of the first layers and/or for at least some of the second layers the layer thickness changes along an extension of the layers.

5. The optical element according to claim 1, wherein a sum of a number of first layers and a number of second layers is at least 5000.

6. The optical element according to claim 5, wherein the sum of the number of first layers and the number of second layers is at least 10000.

7. The optical element according to claim 1, wherein the optical element is a multilayer Laue lens.

8. The optical element according to claim 1, wherein the optical element is a multilayer-based grating in Laue geometry.

9. The optical element according to claim 1, wherein the optical element is an X-ray mirror for reflecting X-rays.

10. The optical element according to claim 1, further comprising a substrate (e.g. Si) and at least one third layer, wherein the multilayer structure is disposed between the substrate and the at least one third layer.

11. A method of producing an optical element for deflecting X-rays, the optical element comprising:
a multilayer structure including a plurality of amorphous first layers of tungsten carbide (WC) and a plurality of amorphous second layers of silicon carbide (SiC);
wherein each two adjacent ones of the first layers are separated by a respective one of the second layers such that the first and second layers are arranged alternatingly; and
wherein at least some of the first layers and at least some of the second layers have a thickness of at least 3 nm, the method comprising:
producing at least one first sputtering target made of WC by magnetron sputtering;
producing at least one second sputtering target made of SiC by magnetron sputtering; and
preparing the multilayer structure by depositing each of the first layers by magnetron sputtering using the at least one first sputtering target and depositing each of the second layers by magnetron sputtering using the at least one second sputtering target.

12. The method according to claim 11, wherein Kr gas is utilized as sputtering gas when producing the at least one first sputtering target and the at least one second sputtering target, and/or when preparing the multilayer structure.

13. A method of using an optical element for deflecting X-rays, the optical element comprising:
a multilayer structure including a plurality of amorphous first layers of tungsten carbide (WC) and a plurality of amorphous second layers of silicon carbide (SiC);
wherein each two adjacent ones of the first layers are separated by a respective one of the second layers such that the first and second layers are arranged alternatingly; and
wherein at least some of the first layers and at least some of the second layers have a thickness of at least 3 nm, wherein the X-rays are high-intensity X-rays having a power per area of at least 500 W/m$^2$, the method comprising:
using the optical element to deflect X-rays.

14. The method according to claim 13, wherein the high-intensity X-rays have an energy of at least 2 keV, preferably at least 8 keV.

15. The method according to claim 13, wherein the high-intensity X-rays are pulsed high-intensity X-rays having a fluence of at least 50 mJ/cm2, a maximum pulse duration of 100 ps, or 100 fs.

* * * * *